US012812244B2

(12) United States Patent
Zhang

(10) Patent No.: US 12,812,244 B2
(45) Date of Patent: Nov. 24, 2026

(54) LOSSLESS PHOTOGRAPHING METHOD AND APPARATUS FOR MOBILE TERMINAL, TERMINAL DEVICE AND STORAGE MEDIUM

(71) Applicant: HUIZHOU TCL MOBILE COMMUNICATION CO., LTD., Huizhou (CN)

(72) Inventor: Hong Zhang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 231 days.

(21) Appl. No.: 18/565,323

(22) PCT Filed: Apr. 7, 2022

(86) PCT No.: PCT/CN2022/085659
§ 371 (c)(1),
(2) Date: Nov. 29, 2023

(87) PCT Pub. No.: WO2022/252814
PCT Pub. Date: Dec. 8, 2022

(65) Prior Publication Data

US 2024/0284045 A1 Aug. 22, 2024

(30) Foreign Application Priority Data

May 31, 2021 (CN) ......................... 202110600196.8

(51) Int. Cl.
*H04N 23/667* (2023.01)
*H04N 23/62* (2023.01)
(Continued)

(52) U.S. Cl.
CPC ......... *H04N 23/667* (2023.01); *H04N 23/683* (2023.01); *H04N 23/69* (2023.01); *H04N 23/62* (2023.01)

(58) Field of Classification Search
CPC .. G06T 3/18; G06T 7/248; G06T 7/50; G06T 7/74; G06T 2207/30241;
(Continued)

(56) References Cited

U.S. PATENT DOCUMENTS

2014/0184852 A1* 7/2014 Niemi .................. H04N 23/741 348/239
2015/0156421 A1 6/2015 Sokeila et al.
(Continued)

FOREIGN PATENT DOCUMENTS

CN 107124549 A 9/2017
CN 107155059 A 9/2017
(Continued)

OTHER PUBLICATIONS

International Search Report in International application No. PCT/CN2022/085659, mailed on Jun. 22, 2022.
(Continued)

*Primary Examiner* — Christopher K Peterson
(74) *Attorney, Agent, or Firm* — PV IP PC; Wei Te Chung

(57) ABSTRACT

Disclosed in the present application are a lossless photographing method and apparatus for a mobile terminal, a terminal device and a storage medium. The method comprises: obtaining a zoom multiple instruction of a camera sensor in the current photographing state when a photographing instruction is detected; determining whether the zoom multiple corresponding to the current zoom multiple instruction is greater than or equal to 2; switching to an image output mode when it is detected that the current zoom multiple is greater than or equal to 2; in the switched image output mode, obtaining a photographing frame image again and sending same to image signal processing; and obtaining an image after the image signal processing and outputting to complete photographing.

20 Claims, 4 Drawing Sheets

(51) Int. Cl.
*H04N 23/68* (2023.01)
*H04N 23/69* (2023.01)

(58) Field of Classification Search
CPC ............. G06T 2207/30244; G06T 7/30; G06T 2207/10016; G06T 7/20; H04N 23/80; H04N 23/667; H04N 23/683; H04N 23/69; H04N 23/62; H04N 25/46; H04N 25/42; H04N 25/40; H04N 23/54; H04N 23/67
See application file for complete search history.

(56) References Cited

U.S. PATENT DOCUMENTS

| | | | | |
|---|---|---|---|---|
| 2016/0057348 | A1* | 2/2016 | Liang | G03B 7/16 348/222.1 |
| 2020/0104021 | A1* | 4/2020 | Bylenok | G06F 3/02 |
| 2021/0067749 | A1* | 3/2021 | Yadav | H04N 23/843 |
| 2021/0075969 | A1 | 3/2021 | Liu et al. | |

FOREIGN PATENT DOCUMENTS

| | | | |
|---|---|---|---|
| CN | 107770451 | A | 3/2018 |
| CN | 108322663 | A | 7/2018 |
| CN | 108377342 | A | 8/2018 |
| CN | 110855896 | A | 2/2020 |
| CN | 113347334 | A | 9/2021 |

OTHER PUBLICATIONS

Written Opinion of the International Search Authority in International application No. PCT/CN2022/085659, mailed on Jun. 22, 2022.
Notification to Grant Patent Right for Invention issued in corresponding Chinese Patent Application No. 202110600196.8 dated Jun. 6, 2022, pp. 1-4.
Chinese Office Action issued in corresponding Chinese Patent Application No. 202110600196.8 dated Jan. 5, 2022, pp. 1-8.
European Search Report in European application No. 22814861.5, mailed on Apr. 4, 2025.

* cited by examiner

LOSSLESS PHOTOGRAPHING METHOD AND APPARATUS FOR MOBILE TERMINAL, TERMINAL DEVICE AND STORAGE MEDIUM

RELATED APPLICATIONS

This application is a National Phase of PCT Patent Application No. PCT/CN2022/085659 having International filing date of Apr. 7, 2022, which claims the benefit of priority of Chinese Patent Application No. 202110600196.8 filed on May 31, 2021. The contents of the above applications are all incorporated by reference as if fully set forth herein in their entirety.

TECHNICAL FIELD

The present application relates to the field of mobile devices, and more particularly, to a lossless photographing method and apparatus for a mobile terminal, a terminal device, and a storage medium.

BACKGROUND

With the development of science and technology, mobile device manufacturers, such as mobile phone manufacturers, continuously introduce mobile phones equipped with higher pixel cameras as new products. Currently, mainstream mobile phone manufacturers generally use a combination of a wide-angle lens and a long-focus lens to realize optical zooming of a mobile phone photographing. When a camera is turned on, the mobile phone automatically initiates a dual camera photographing, and uses the wide-angle lens as a preview, and enables the long-focus lens in a ready state. When a user needs to shoot a long-view image, the long-view image is obtained by the dual-camera photographing and has a better quality but a higher cost. By means of digital zooming of a single camera, that is, by a method of clipping and amplifying a central portion of an image, the loss of the long-view image is relatively serious, and in the prior art, it is impossible to obtain the long-view image having the better image quality with the single camera.

Accordingly, an improvement and a development is needed for defects existing in the prior art.

SUMMARY

Technical Problems

The technical problems to be solved by the present application are, for the above drawbacks of the prior art, to provide a lossless photographing method and apparatus for a mobile terminal, a terminal device, and a storage medium. The present application can solve the problem of obtaining worse image quality by digital zooming when a single camera performs high-magnification zooming in the prior art.

Solutions to Problems

Technical Solutions

To solve the above problems, technical solutions of the present application are as follows.

A lossless photographing method for a mobile terminal includes:

obtaining a zoom multiple instruction of a camera sensor in a current photographing state in response to a photographing instruction being detected;

determining whether a zoom multiple corresponding to the zoom multiple instruction is greater than or equal to 2;

switching an image output mode in response to the zoom multiple being greater than or equal to 2;

regaining and sending a photographing frame image for an image signal processing in the switched image output mode; and obtaining and outputting the processed image to finish photographing.

The lossless photographing method further includes: before the obtaining of the zoom multiple instruction, presetting two image output modes including a Binning output mode and a Crop output mode on the camera sensor;

obtaining a photographing frame image in the Crop output mode in response to the zoom multiple in the photographing state being greater than or equal to 2;

obtaining the photographing frame image in the Binning output mode in response to the zoom multiple in the photographing state being less than 2; and previewing the image using the Binning output mode in response to the mobile terminal being in the photographing preview state.

In the lossless photographing method, the determining whether the zoom multiple corresponding to the current zoom multiple instruction is greater than or equal to 2 includes:

obtaining a zoom multiple of the zoom multiple instruction in the photographing state; and determining whether the zoom multiple is greater than or equal to 2.

In the lossless photographing method, the switching of the image output mode includes:

in response to the zoom multiple being greater than or equal to 2, switching the image output mode from the Binning output mode to the Crop output mode to rewrite a register of the camera sensor; and in response to the zoom multiple being less than 2, maintaining the image output mode to be the Binning output mode.

In the lossless photographing method, the regaining and sending the photographing frame image includes:

waiting for the rewriting of the register of the camera sensor to be completed;

regaining the photographing frame image in the Crop output mode; and sending the regained photographing frame image for the image signal processing and switching the image output mode back to the Binning output mode to rewrite the register.

The lossless photographing method further includes: after the switching of the image output mode, obtaining the photographing frame image in the Binning output mode; and sending the regained photographing frame image for the image signal processing.

In the lossless photographing method, the obtaining and outputting the image include:

obtaining the processed image; and storing the image in a storage space.

A lossless photographing apparatus includes:

a photographing instruction detection module for detecting whether a photographing instruction is received;

a zoom multiple detection module for detecting whether a zoom multiple of a camera sensor in a photographing state corresponding to the photographing instruction is greater than or equal to 2;

an output model switching module for switching an image output mode from a Binning output mode to a Crop output mode in response to the zoom multiple being greater than or equal to 2, and maintaining the image output mode to be the Binning output mode in response to the zoom multiple being less than 2;

an output image obtaining module for obtaining a photographing frame image output in the Crop output mode or the Binning output mode; and an output image processing module for performing an image signal processing on the photographing frame image; and an image outputting module for outputting the image into a storage space of a mobile terminal.

A terminal device includes: a memory, a processor, and a lossless photographing program stored on the memory and operable on the processor, where the lossless photographing program, when executed by the processor, implements steps of any of the lossless photographing methods described above.

A computer readable storage medium stores a lossless photographing program for a mobile terminal which, when executed by a processor, causes the processor to perform steps of any of the lossless photographing methods described above.

BENEFICIAL EFFECTS OF INVENTION

Beneficial Effects

Compared with the prior art, the present application provides the lossless photographing method for the mobile terminal, where the method includes: when a photographing instruction is received by the mobile terminal, detecting a zoom multiple in a current photographing state; when the zoom multiple is less than 2, maintaining an output mode of a camera sensor, and obtaining and sending a photographed frame image in the output mode for an image signal processing to output a final image; when the zoom multiple is greater than or equal to 2, switching an output mode of the camera sensor and obtaining and sending a photographing frame image in the switched output mode for the image signal processing to output a final image, where the final image obtained in the mode can achieve the effect that the final image is magnified lossless when the zoom multiple is 2 and improved significantly when the zoom multiple is greater than or equal to 2, thereby providing a better photographing quality for a mobile devices having a single camera.

BRIEF DESCRIPTION OF THE DRAWINGS

Description of the Drawings

Figure 1:
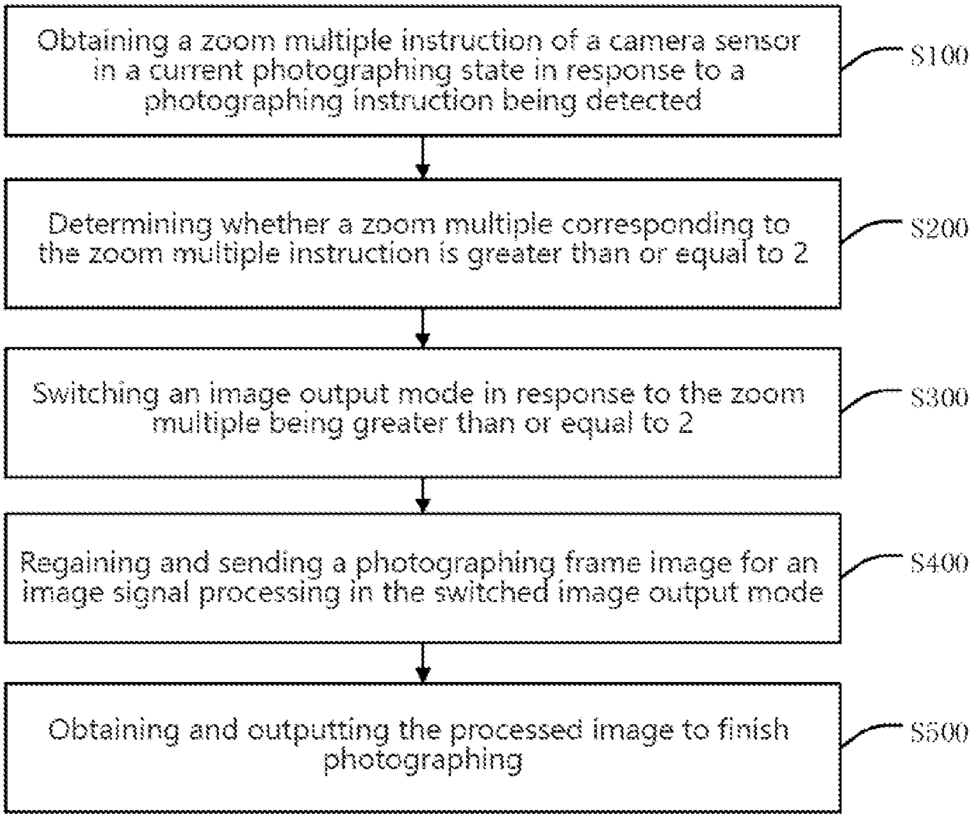

FIG. 1 is a flowchart of a specific implementation of a lossless photographing method for a mobile terminal according to some embodiments of the present application.

Figure 2:
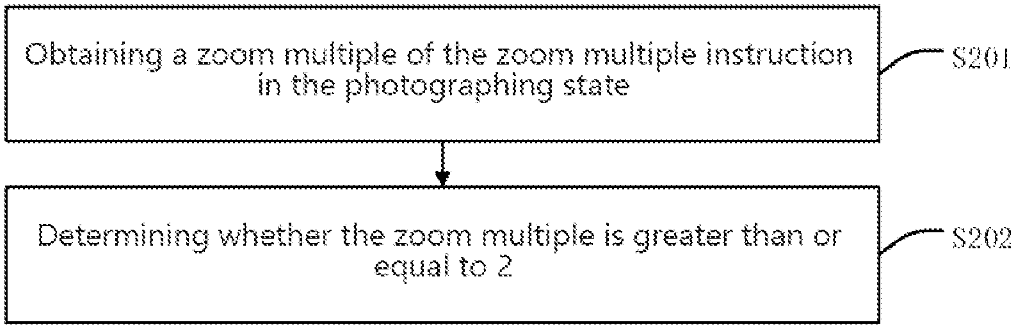

FIG. 2 is a schematic diagram of a flow of determining whether a zoom multiple corresponding to the zoom multiple instruction is greater than or equal to 2 according to some embodiments of the present application.

Figure 3:
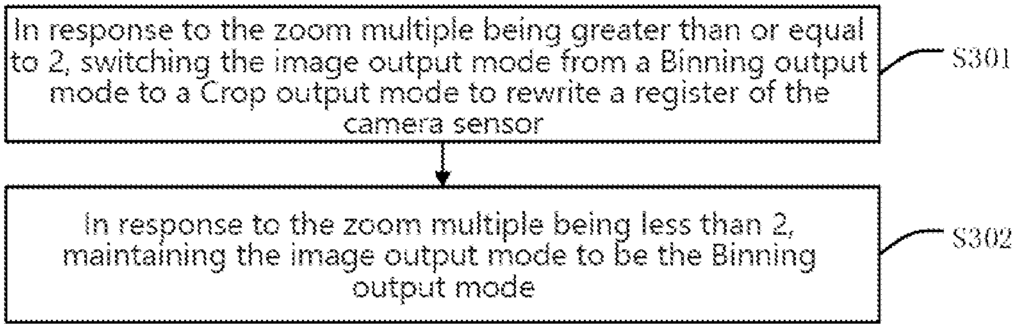

FIG. 3 is a schematic diagram of a flow of switching an image output mode in response to the zoom multiple being greater than or equal to 2 according to some embodiments of the present application.

Figure 4:
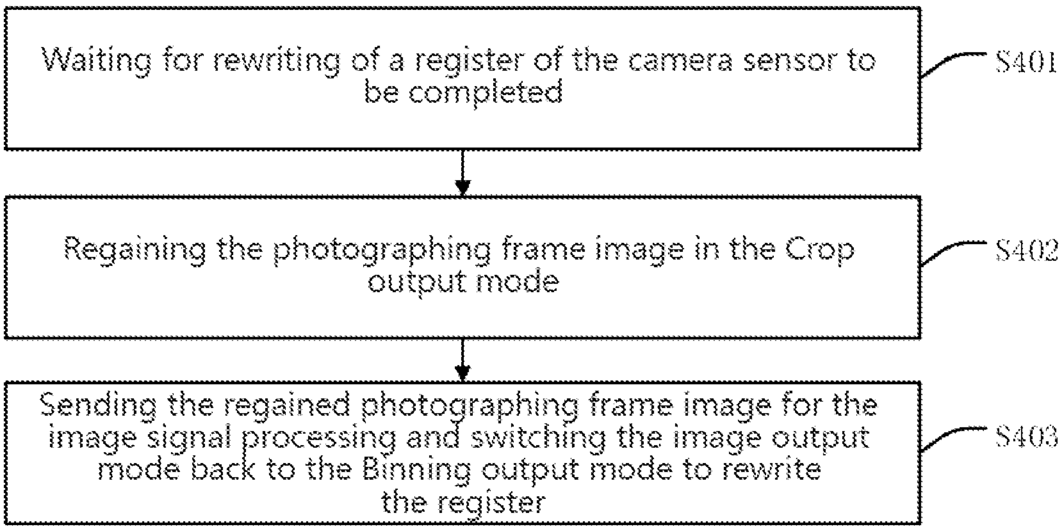

FIG. 4 is a schematic diagram of a flow of regaining and sending a photographing frame image for an image signal processing in the switched image output mode according to some embodiments of the present application.

Figure 5:
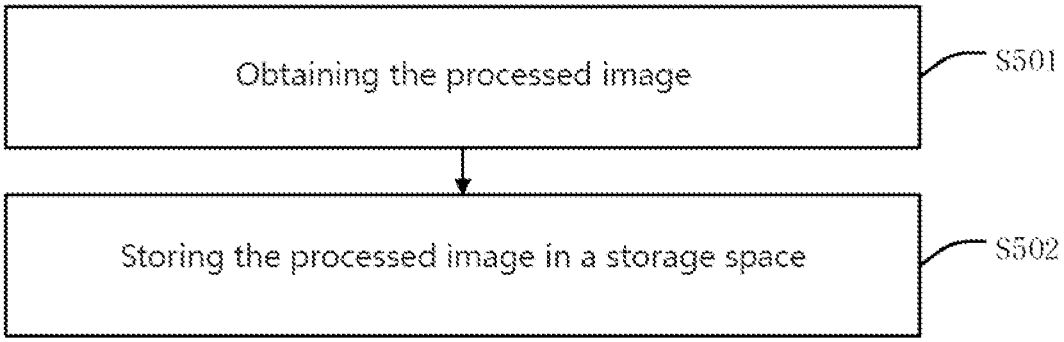

FIG. 5 is a schematic diagram of a flow of obtaining and outputting the processed image to finish photographing according to some embodiments of the present application.

Figure 6:
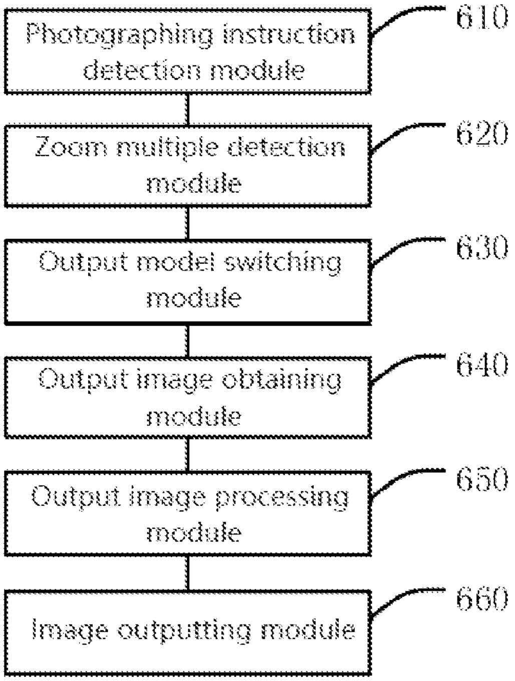

FIG. 6 is a schematic block diagram of a lossless photographing apparatus for a mobile terminal according to some embodiments of the present application.

Figure 7:
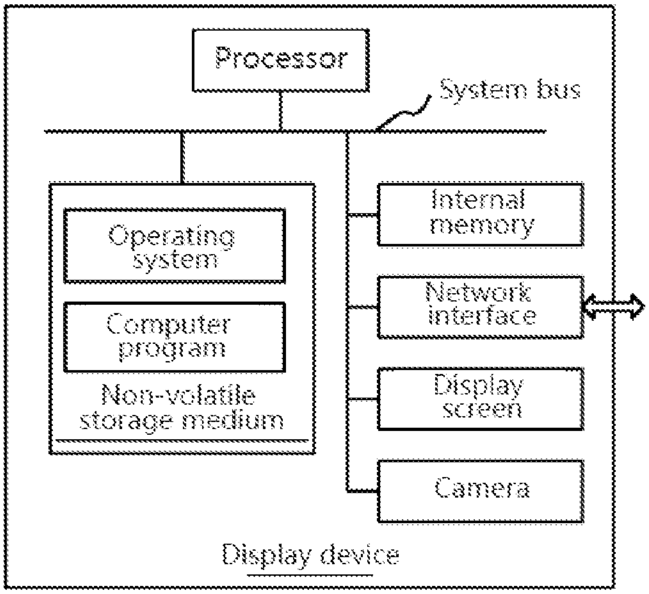

FIG. 7 is a schematic structural diagram of a terminal device according to some embodiments of the present application.

The implementation, functional features and advantages of the objects of the present application will be further described with reference to the embodiments and the accompanying drawings.

EMBODIMENTS OF INVENTION

Detailed Description

It should be understood that the specific implementations described here are only used to explain the present application, and are not used to limit the present application.

In the following description, suffixes such as "module", "part", or "unit" are for the purpose of benefit of illustration of the present application and have no particular meaning in themselves. Therefore, "module", "part", or "unit" can be used interchangeably.

To make the objectives, technical solutions, and advantages of the present application more clear and definite, the present application is illustrated in detail below by referring to the accompanying drawings and illustrating the embodiments. It should be understood that the specific implementations described here are only used to explain the present application, and are not used to limit the present application.

It should be noted that all directional indications (such as up, down, left, right, front, back, etc.) in the embodiments of the present application are only intended to explain a relative positional relationship, a motion situation, and the like between components in a particular pose (as shown in the drawings), and if the particular pose changes, the directional indication changes accordingly.

In addition, if terms "first", "second" or the like are involved in the embodiments of the present application, the terms are for illustrative purposes only and are not to be construed as indicating or imposing a relative importance or implicitly indicating the number of technical features indicated. Thus, a feature that limited by "first", "second" may expressly or implicitly include at least one of the features. In addition, the technical solutions of the various embodiments may be combined with each other, but the combination of the technical solutions must be realized by a person of ordinary skill in the art. When the combination of the technical solutions is inconsistent with each other or cannot be realized, the combination of the technical solutions should be considered not to exist or fall within the protection scope of the present application.

With the development of science and technology and the continuous improvement of people's living standards, the performance of new mobile phones introduced by various mobile device manufacturers, such as mobile phone manufacturers, is getting stronger and stronger, and the camera pixels mounted on the mobile phones are getting higher and higher. Nowadays, the mobile phones can easily perform various functions such as photographing and shooting video shake prevention, 10× mixed zooming, 4K ultra-high definition video shooting, so that people who can hardly take pictures can also take high-definition and beautiful pictures with their hands, and people in the field of shooting can also record details of life with their hands using high-pixel mobile phones.

It has been found that each of the mobile phone manufacturer designs mobile phones and a user selects new mobile phones in consideration of the latest basic mobile phone, and a low-configuration mobile phone in the new mobile phones is also widely popular, for example, a mobile phone with a youth suffix in a millet mobile phone and a red rice mobile phone famous for a cost-effective ratio. The low-configuration mobile phone can design a parity mobile phone focused on game performance or a parity mobile phone focused on a camera function according to user requirements. However, when only a single camera can be mounted on the parity mobile phone for cost reasons, only a minimum requirement for photographing can be met, which is mainly manifested in defects such as blurring of picture quality and color distortion, so that the user cannot enjoy the photographing function of the parity mobile phone. The main reason for blurring of the image quality is that a single camera adopts a single digital zoom mode when digital zooming. That is, the image output by the camera sensor is first cut at the center of the image according to the zoom multiple, and then the cut portion is stretched back to the original size. The zoom mode will lose the image quality, and the loss of the image quality is particularly serious when zooming in a high multiple, which brings a poor photographing experience to the user of the mobile phone having the single camera.

To solve the above problems, an embodiment of the present application provides a lossless photographing method of a mobile terminal. The lossless photographing method according to the present embodiment can include: automatically detecting whether a photographing instruction is received by the mobile terminal; when the photographing instruction is received, obtaining a zoom multiple instruction of a camera sensor in a photographing state and determining whether the zoom multiple is greater than or equal to 2; and when the zoom multiple is greater than or equal to 2, switching an image output mode of the camera sensor to a Crop output mode, and further obtaining and sending a photographing frame image in the Crop output mode for and image signal processing and output. A final image obtained in the Crop output mode can provide a twice lossless zoom and a high multiple zoom image which greatly improves image quality based on the twice lossless zoom, thereby providing a better photographing image quality for a mobile phone having a single camera, and providing a better photographing experience for a user.

EXEMPLARY METHOD

First Embodiment

As shown in FIG. 1, an embodiment of the present application provides a lossless photographing method for a mobile terminal, which can be used in a mobile device such as a mobile phone or a tablet. The method described in the embodiment of the present application includes following steps.

At step S100, a zoom multiple instruction of a camera sensor in a current photographing state is obtained in response to a photographing instruction being detected.

In the embodiment, when it is detected in the mobile terminal that a physical button for photographing is pressed or a photographing button is pressed on the touch screen in a photographing application, a zoom multiple instruction including a zoom multiple executed by the camera sensor in a current photographing state is obtained.

For example, in a case that a photographing application (APP) carried on a mobile phone of a certain brand is used, when the photographing button is pressed on the touch screen, the mobile phone receives and detects a photographing instruction, and obtains a zoom multiple instruction including a zoom multiple executed by a camera, i.e., a camera sensor, at a moment when the photographing button is currently pressed. For example, if an image is magnified twice by the user in a two-finger zooming manner when previewing the image, the camera sensor executes a twice zooming instruction, and the mobile phone obtains a twice zooming instruction including a zooming multiple executed by the camera sensor.

Whether a zoom multiple corresponding to the zoom multiple instruction is greater than or equal to 2 is further determined at step S200.

In the present embodiment, the mobile terminal extracts the zoom multiple in the zoom multiple instruction, and determines whether the zoom multiple is greater than or equal to 2, including a first case that the zoom multiple is greater than or equal to 2 and a second case that the zoom multiple is less than 2.

Specifically, as shown in FIG. 2, the step S200 includes:

a step S201 of obtaining a zoom multiple of the zoom multiple instruction in the photographing state; and a step S202 of determining whether the zoom multiple is greater than or equal to 2.

For example, if an image is magnified by 2.1 times by a user when using the photographing application and previewing the image, zoom magnification information of 2.1 is included in the zoom multiple instruction executed by the camera sensor and obtained by the mobile phone when the photographing button is pressed. The mobile phone extracts the zoom multiple of 2.1 of the camera sensor in the current photographing state from the zoom multiple instruction, and compares the zoom multiple with 2. If 2.1 is greater than or equal to 2, it is determined that the current zoom multiple is greater than or equal to 2.

An image output mode is further switched in response to the zoom multiple being greater than or equal to 2 at a step S300.

The lossless photographing method further includes: before the obtaining of the zoom multiple instruction, presetting two image output modes including a Binning output mode and a Crop output mode on the camera sensor;

obtaining a photographing frame image in the Crop output mode in response to the zoom multiple in the photographing state being greater than or equal to 2;

obtaining the photographing frame image in the Binning output mode in response to the zoom multiple in the photographing state being less than 2; and previewing the image using the Binning output mode in response to the mobile terminal being in the photographing preview state.

In the present embodiment, when the mobile terminal determines that the zoom multiple in the photographing state is equal to or greater than 2, the image output mode of the camera sensor is switched.

Specifically, as shown in FIG. 3, the step S300 includes:

a step S301 of, in response to the zoom multiple being greater than or equal to 2, switching the image output mode from the Binning output mode to the Crop output mode to rewrite a register of the camera sensor; and a step S302 of, in response to the zoom multiple being less than 2, maintaining the image output mode to be the Binning output mode.

For example, if a user clicks a photographing button in a preview state in which the zoom multiple is 3 when the APP of the mobile phone is used for the photographing, the mobile phone determines that the zoom multiple is greater than or equal to 2, the camera sensor switches the image output mode to the Crop output mode, rewrites a register of the camera sensor, and resets configuration of the register of the camera sensor in the Crop output mode. The Crop output mode is a center region cropping mode, which is a technology in which a camera sensor processes and directly outputs an obtained image by directly taking a middle quarter region of the image obtained by the camera sensor. Therefore, an image Field of View (FOV) obtained at the time of outputting of the image is already an effect in which an image has twice zoom, and the image does not have a picture quality loss. That is, an original image photographed in a state of a zoom multiple of 2 and directly output in the Crop output mode is a lossless image having twice zoom. If a user clicks a photographing button in a preview state in which the zoom multiple is 1.5 when using the APP of the mobile phone, the mobile phone determines that the zoom multiple is less than 2, and the camera sensor does not switch the output mode and maintains the Binning output mode. The Binning output mode is a multi-in-one combination output mode, which is a technology in which a camera sensor processes and outputs an obtained image by combining a plurality of adjacent pixels in the image obtained by the camera sensor into one pixel. A camera sensor supporting a four-in-one combination output mode is used in the present embodiment, and adjacent four pixels can be combined into one pixel. Therefore, an image having a size of ¼ of an original image obtained by the camera sensor is obtained. However, the FOV is unchanged, and the image sensitivity and the output speed can be improved, but the resolution of the image is reduced so that the captured image is blurred.

A photographing frame image for an image signal processing are further regained and sent in the switched image output mode at a step S400.

In the present embodiment, when the camera sensor is switched to the Crop output mode, the image is regained in the Crop output mode, and an image having twice zoom and no loss of an image quality or a lossless image based on the twice zoom can be obtained, to further obtain a higher zoom multiple image with a digital zoom. After the image is sent for the image signal processing, the final image can be seen when the photographing is performed by the mobile phone in daily life.

Specifically, as shown in FIG. 4, the step S400 includes:

a step S401 of waiting for the rewriting of a register of the camera sensor to be completed;

a step S402 of regaining the photographing frame image in the Crop output mode; and a step S403 of sending the regained photographing frame image for the image signal processing and switching the image output mode back to the Binning output mode to rewrite the register.

For example, the waiting for the rewriting of the register of the camera sensor to be completed means waiting for processing parameters of the image obtained by the camera sensor in the Crop output mode to be written into the register, regaining a photographing frame image in the Crop output mode (for example, when the zoom multiple of the camera sensor in the current photographing state is 4, the camera sensor obtains an image within ¼ of a region to obtain a lossless image having twice zoom, performs twice digital zoom on the lossless image to obtain a photographing frame image having four times zoom and lower image quality loss), sending the photographing frame image for an image signal processing and controlling the camera sensor to switch back to the Binning output mode to rewrite the register, and continuing to preview the image to wait for detection of a next photographing instruction. The image signal processing (an Image Signal Process algorithm) is a processing method in which an image output by a camera sensor is processed to be close to an expected image of a human being. An original image directly output by the camera sensor is greatly different from an image expected or seen by human being due to a physical defect of the lens or the sensor itself and a difference of light rays. A human eye can automatically adjust a pupil to see a majority of things at brightness through the pupil, but a hardware cannot do this. A series of corrections of the IPS algorithm such as color correction, noise spot processing, and image repair are required for the original image to obtain an image expected by the human being.

The lossless photographing method further includes: after switching the image output mode in response to the zoom multiple being greater than or equal to 2, obtaining the photographing frame image in the Binning output mode; and sending the regained photographing frame image for the image signal processing.

For example, when a user photographs an image of 1.5 times zoom using a mobile phone, a camera sensor of the mobile phone directly obtains and sends a photographing frame image in the Binning output mode for the image signal processing. To further improve an image obtaining speed in the Binning output mode, a buffer queue (Buffer Queue) is set for temporarily storing the photographing frame image of the camera sensor, and the closest image output in the queue can be directly taken when the user clicks on the photographing. Specifically, a temporary storage queue Queue of a fixed size is set. When a user performs image browsing and has not yet clicked the photographing button, a plurality of latest photographing frame images are stored in the Queue, and old photographing frame images are continuously deleted in a preview process and the latest photographing frame images are added. When the user presses the photographing button, the user directly obtains the latest photographing frame images from the Queue or selects an optimal image to be output by an algorithm, thereby achieving an effect of Zero Shutter Lag (ZSL), i.e., obtaining a final image at a photographing instant, and improving a photographing experience of the user when using a mobile terminal such as a mobile phone.

The processed image is further obtained and outputted to finish photographing.

In the present embodiment, the mobile terminal obtains an image on which the image signal processing has been completed, and stores the image in a storage space such as a memory of the mobile terminal or a cloud.

Specifically, as shown in FIG. 5, the step S500 includes:

a step S501 of obtaining the processed image; and a step S502 of storing the image in a storage space.

For example, an image captured by a user with a mobile phone can be generally stored in a photo album, i.e., a storage space of the mobile phone itself, after the image signal processing is performed on the image. The user may also connect a plurality of mobile terminals to the cloud, so that the images captured by the mobile terminals are directly uploaded to the cloud for storage.

In the present embodiment, the Binning output mode and the Crop output mode are different from each other in the register configuration. In addition to the need to rewrite the register when switching of the image output mode for the Binning output mode, image processing configurations of the display screen to which the images are output in the two output modes are also different from each other. The image processing configurations include configurations such as an Automatic Exposure (AE) exposure, an Auto White Balance (AWB) white balance, and the like. If the image in the Crop output mode is displayed on the display screen of the mobile terminal, the data stream needs to be restarted, and the image processing parameters need to be reconfigured. In the present embodiment, the step of switching the Binning output mode or the Crop output mode is arranged after the step of detecting the photographing instruction, so that the camera sensor needs to output at least one photographing frame image in the Crop output mode, and only the one photographing frame image needs to be processed in the background. That is, the image in the Crop mode is displayed on the display screen of the mobile terminal without restarting the data stream, thereby greatly reducing the sense of pause in photographing with the present embodiment.

In the second embodiment, in order to further improve a switching speed when the camera sensor performs switching of the output mode and reduce the sense of pause caused by the switching of the output mode, a camera sensor having a Seamless (no delay) switching function is used in the present embodiment, and the mobile terminal can directly set different output modes of the camera sensor and rewrite the register of the camera sensor with the Seamless switching function, thereby accelerating the switching speed of different modes. By providing an Optical Image Stabilizer (OIS) in the mobile terminal, the sense of pause generated by the camera sensor in switching the output mode can be further reduced to a non-sensible level.

In the third embodiment, to further improve the processing speed of lossless photographing of the mobile terminal, steps of detecting and determining whether a current zoom multiple is greater than or equal to 2 may be disposed before detecting the photographing instruction, and a pre-stored value may be set, where the pre-stored value has only two states of 0 and 1. When the pre-stored value is 0, it indicates that the zoom multiple of the mobile terminal in the preview mode before photographing is less than 2. When the pre-stored value is 1, it indicates that the zoom multiple of the mobile terminal in the preview mode before photographing is greater than or equal to 2. When the mobile terminal detects the photographing instruction, the mobile terminal directly calls the pre-stored value and performs the steps of switching the mode and outputting the image. The step of determining that the sense of pause is not generated before the photographing instruction is detected may shorten determination step between the user pressing the photographing key and obtaining the final image, thereby further reducing the sense of pause that the user may generate when the mobile terminal is used for lossless photographing.

In the fourth embodiment, in order to improve the use experience of the continuous shooting function of the mobile terminal, after the output mode of the camera sensor is switched to the Crop output mode and the mobile terminal obtains the photographing frame image, the camera sensor is switched back to the Binning output mode after a delay of 0.1-0.2 s, so that the user does not experience a continuous sense of pause due to the back-and-forth switching of the output mode of the camera sensor when the continuous shooting function or the manual multi-continuous shooting is used, resulting in a problem of reducing the use experience of the multi-continuous shooting. Alternatively, a switching bottom that supports a multi-continuous shooting function is set. When the multi-continuous shooting function is enabled, a delay of switching of the Crop output mode exists. When the multi-continuous shooting function is disabled, the Crop output mode is switched back to the Binning output mode immediately after the mobile terminal obtains the photographing frame image. Alternatively, the delay is bound to the automatic multi-continuous shooting function of the mobile terminal. Whenever the user performs an N-continuous shooting function ($N \geq 2$), it waits for the continuous shooting function to be completed before the output mode is switched back to the Binning output mode.

Exemplary device

As shown in FIG. 6, an embodiment of the present application provides a lossless photographing apparatus for a mobile terminal, including a photographing instruction detection module 610, a zoom multiple detection module 620, an output mode switching module 630, an output image obtaining module 640, an output image processing module 650, and an image outputting module 660. Specifically, the photographing instruction detection module 610 is configured to detect whether a photographing instruction is received. The zoom multiple detection module 620 is configured to detect a zoom multiple of a camera sensor in a photographing state corresponding to the photographing instruction is greater than or equal to 2. The output mode switching module 630 is configured to switch an image output mode from a Binning output mode to a Crop output mode in response to the zoom multiple being greater than or equal to 2, and maintaining the image output mode to be the Binning output mode in response to the zoom multiple being less than 2. The output image obtaining module 640 is configured to obtain a photographing frame image output in the Crop output mode or the Binning output mode. The output image processing module 650 is configured to perform performing an image signal processing on the photographing frame image. The image outputting module 660 is configured to output the image into a storage space of a mobile terminal.

Based on the embodiments described above, the present application further provides a terminal device, of which a schematic structural diagram can be shown in FIG. 7. The terminal device includes a processor, a memory, a network interface, and a display screen connected through a system bus. The processor of the terminal device is configured to provide computing and control capabilities. The memory of the terminal device includes a non-volatile storage medium and an internal memory. The non-volatile storage medium stores an operating system and a computer program. The internal memory provides an environment for the operation of the operating system and the computer program in the non-volatile storage medium. The network interface of the terminal device is configured to be in communication with an external terminal through a network connection. The computer program, when executed by the processor, implements a lossless photographing for a mobile terminal. The display screen of the terminal device may be a liquid crystal display screen or an electronic ink display screen.

It should be understood by those skilled in the art that the schematic structural diagram shown in FIG. 7 is merely a block diagram of a portion of the structure associated with the solution of the present application and does not constitute a definition of the terminal device to which the solution of the present application is applied. A particular terminal device may include more or fewer components than shown, or some combination of components, or have different arrangements of components.

A terminal device is provided in an embodiment, includes: a memory, a processor, and a terminal data processing program stored on the memory and operable on the processor, where the process performs steps including:

obtaining a zoom multiple instruction of a camera sensor in a current photographing state in response to a photographing instruction being detected;

determining whether a zoom multiple corresponding to the zoom multiple instruction is greater than or equal to 2;

switching an image output mode in response to the zoom multiple being greater than or equal to 2;

regaining and sending a photographing frame image for an image signal processing in the switched image output mode; and obtaining and outputting the processed image to finish photographing.

The lossless photographing method further includes: before the obtaining of the zoom multiple instruction, presetting two image output modes including a Binning output mode and a Crop output mode on the camera sensor;

obtaining a photographing frame image in the Crop output mode in response to the zoom multiple in the photographing state being greater than or equal to 2;

obtaining the photographing frame image in the Binning output mode in response to the zoom multiple in the photographing state being less than 2; and previewing the image using the Binning output mode in response to the mobile terminal being in the photographing preview state.

In the lossless photographing method, the determining whether the zoom multiple corresponding to the current zoom multiple instruction is greater than or equal to 2 includes:

obtaining a zoom multiple of the zoom multiple instruction in the photographing state; and determining whether the zoom multiple is greater than or equal to 2.

In the lossless photographing method, the switching the image output mode in response to the zoom multiple being greater than or equal to 2 includes:

in response to the zoom multiple being greater than or equal to 2, switching the image output mode from the Binning output mode to the Crop output mode to rewrite a register of the camera sensor; and in response to the zoom multiple being less than 2, maintaining the image output mode to be the Binning output mode.

In the lossless photographing method, regaining and sending a photographing frame image for an image signal processing in the switched image output mode include:

waiting for the rewriting of the register of the camera sensor to be completed;

regaining the photographing frame image in the Crop output mode; and sending the regained photographing frame image for the image signal processing and switching the image output mode back to the Binning output mode to rewrite the register.

The lossless photographing method further includes: after the switching the image output mode in response to the zoom multiple being greater than or equal to 2, obtaining the photographing frame image in the Binning output mode; and sending the regained photographing frame image for the image signal processing.

In the lossless photographing method, the obtaining and outputting the image include:

obtaining the processed image; and storing the image in a storage space.

It should be understood by those of ordinary skill in the art that all or a portion of the flows of implementing the methods of the embodiments described above may be accomplished by a computer program instructing relevant hardware that may be stored in a non-volatile computer-readable storage medium that, when executed, may include the flows of the method embodiments described above. Any reference to memory, storage, database or other medium used in the embodiments provided in the present application may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, the RAM may be available in a variety of forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) RAM (RDRAM), direct memory bus dynamic RAM (DRDRAM), and memory bus dynamic RAM (RDRAM).

In summary, disclosed in the present application are the lossless photographing method and apparatus for the mobile terminal, the terminal device and the storage medium. The method includes: obtaining the zoom multiple instruction of the camera sensor in the current photographing state in response to the photographing instruction being detected; determining whether the zoom multiple corresponding to the zoom multiple instruction is greater than or equal to 2; switching the image output mode in response to the zoom multiple being greater than or equal to 2; regaining and sending the photographing frame image for the image signal processing in the switched image output mode; and obtaining and outputting the processed image to finish photographing. The present application aims at solving the problem in the prior art of poor image quality when a mobile terminal carrying a single camera performs high zoom photographing, improving the picture quality photographed by the single camera, and improving the photographing experience when the user uses the mobile terminal.

It should be understood that the application of the present application is not limited to the above examples, and that modifications or changes may be made to those of ordinary skill in the art in light of the above description, all of which are intended to fall within the scope of the claims appended to the present application.

What is claimed is:

1. A lossless photographing method for a mobile terminal, comprising:

obtaining a zoom multiple instruction of a camera sensor in a current photographing state in response to a photographing instruction being detected;

determining whether a zoom multiple corresponding to the zoom multiple instruction is greater than or equal to 2;

switching an image output mode in response to the zoom multiple being greater than or equal to 2;

regaining and sending a photographing frame image for an image signal processing in the switched image output mode; and obtaining and outputting the processed image to finish photographing;

wherein the lossless photographing method of the mobile terminal further comprises:

setting a buffer queue used for storing photographing frame images of the camera sensor;

storing the photographing frame images acquired by the camera sensor into the buffer queue;

obtaining the photographing frame images from the buffer queue in a Binning output mode;

wherein the buffer queue is configured to store a plurality of latest photographing frame images when a user is performing image preview and has not yet pressed a photographing button, and old photographing frame images are continuously deleted and latest photographing frame images are added during the preview process; and wherein when the user presses the photographing button, directly obtaining the latest photographing frame image from the buffer queue or selecting an optimal image by an algorithm for output;

wherein the switching of the image output mode is performed in response to the photographing instruction being detected and when the zoom multiple is greater than or equal to 2; wherein the buffer queue is used to provide at least one latest photographing frame image when the photographing instruction is detected.

2. The method of claim 1, further comprising: before the obtaining of the zoom multiple instruction, presetting two image output modes including the Binning output mode and a Crop output mode on the camera sensor;

obtaining a photographing frame image in the Crop output mode in response to a zoom multiple in a photographing state being greater than or equal to 2;

obtaining the photographing frame image in the Binning output mode in response to the zoom multiple in the photographing state being less than 2; and previewing the image using the Binning output mode in response to the mobile terminal being in a photographing preview state.

3. The method of claim 1, wherein the determining whether the zoom multiple corresponding to the current zoom multiple instruction is greater than or equal to 2 comprises:

obtaining a zoom multiple of the zoom multiple instruction in the photographing state; and determining whether the zoom multiple is greater than or equal to 2.

4. The method of claim 1, wherein the switching of the image output mode comprises:

in response to the zoom multiple being greater than or equal to 2, switching the image output mode from the Binning output mode to a Crop output mode to rewrite a register of the camera sensor; and in response to the zoom multiple being less than 2, maintaining the image output mode to be the Binning output mode.

5. The method of claim 4, further comprising: after the switching of the image output mode, obtaining a photographing frame image in the Binning output mode; and sending the obtained photographing frame image for the image signal processing.

6. The method of claim 5, further comprising: before obtaining the photographing frame image in the Binning output mode, providing a buffer queue for storing photographing frame images of the camera sensor; and storing the photographing frame image obtained by the camera sensor in the buffer queue;

the obtaining the photographing frame image in the Binning output mode comprises:

obtaining the photographing frame image from the buffer queue in the Binning output mode.

7. The method of claim 1, wherein the regaining and sending the photographing frame image comprise:

waiting for rewriting of a register of the camera sensor to be completed;

regaining the photographing frame image in the Crop output mode; and sending the regained photographing frame image for the image signal processing and switching the image output mode back to the Binning output mode to rewrite the register.

8. The method of claim 1, wherein the obtaining and outputting the processed image comprise:

obtaining the processed image; and storing the processed image in a storage space.

9. The method of claim 1, wherein the obtaining of the zoom multiple instruction comprises:

generating the photographing instruction when it is detected that a physical button for photographing in the mobile terminal is pressed or when it is detected that a photographing button under the touch screen in a photographing application of the mobile terminal is pressed; and obtaining the zoom multiple instruction of the camera sensor in the current photographing state based on the photographing instruction.

10. The method of claim 1, further comprising: before the obtaining of the zoom multiple instruction, receiving a zoom multiple adjustment operation input by a user; and adjusting the zoom multiple of the camera based on the zoom multiple adjustment operation.

11. A terminal device, comprising: a memory, a processor, and a lossless photographing program stored on the memory and operable on the processor, wherein the lossless photographing program, when executed by the processor, implements operations comprising:

obtaining a zoom multiple instruction of a camera sensor in a current photographing state in response to a photographing instruction being detected;

determining whether a zoom multiple corresponding to the zoom multiple instruction is greater than or equal to 2;

switching an image output mode in response to the zoom multiple being greater than or equal to 2;

regaining and sending a photographing frame image for an image signal processing in the switched image output mode; and obtaining and outputting the processed image to finish photographing;

wherein the lossless photographing method of the mobile terminal further comprises:

setting a buffer queue used for storing photographing frame images of the camera sensor;

storing the photographing frame images acquired by the camera sensor into the buffer queue;

obtaining the photographing frame images from the buffer queue in a Binning output mode;

wherein the buffer queue is configured to store a plurality of latest photographing frame images when a user is performing image preview and has not yet pressed a photographing button, and old photographing frame images are continuously deleted and latest photographing frame images are added during the preview process; and wherein when the user presses the photographing button, directly obtaining the latest photographing frame image from the buffer queue or selecting an optimal image by an algorithm for output;

wherein the switching of the image output mode is performed in response to the photographing instruction being detected and when the zoom multiple is greater than or equal to 2; wherein the buffer queue is used to provide at least one latest photographing frame image when the photographing instruction is detected.

12. The terminal device of claim 11, wherein the operations further comprise: before the obtaining of the zoom multiple instruction, presetting two image output modes including the Binning output mode and a Crop output mode on the camera sensor;

obtaining a photographing frame image in the Crop output mode in response to a zoom multiple in a photographing state being greater than or equal to 2;

obtaining the photographing frame image in the Binning output mode in response to the zoom multiple in the photographing state being less than 2; and previewing the image using the Binning output mode in response to the mobile terminal being in a photographing preview state.

13. The terminal device of claim 11, wherein the determining whether the zoom multiple corresponding to the current zoom multiple instruction is greater than or equal to 2 comprises:

obtaining a zoom multiple of the zoom multiple instruction in the photographing state; and determining whether the zoom multiple is greater than or equal to 2.

14. The terminal device of claim 11, wherein the switching of the image output mode comprises:

in response to the zoom multiple being greater than or equal to 2, switching the image output mode from the Binning output mode to a Crop output mode to rewrite a register of the camera sensor; and in response to the zoom multiple being less than 2, maintaining the image output mode to be the Binning output mode.

15. The terminal device of claim 14, wherein the operations further comprise: after the switching of the image output mode, obtaining a photographing frame image in the Binning output mode; and sending the obtained photographing frame image for the image signal processing.

16. The terminal device of claim 11, wherein the regaining and sending the photographing frame image comprise:

waiting for rewriting of a register of the camera sensor to be completed;

regaining the photographing frame image in the Crop output mode; and sending the regained photographing frame image for the image signal processing and switching the image output mode back to the Binning output mode to rewrite the register.

17. The terminal device of claim 11, wherein the obtaining and outputting the processed image comprise:

obtaining the processed image; and storing the processed image in a storage space.

18. The terminal device of claim 11, wherein the obtaining of the zoom multiple instruction comprises:

generating the photographing instruction when it is detected that a physical button for photographing in the mobile terminal is pressed or when it is detected that a photographing button under the touch screen in a photographing application of the mobile terminal is pressed; and obtaining the zoom multiple instruction of the camera sensor in the current photographing state based on the photographing instruction.

19. The terminal device of claim 11, wherein the operations further comprise: before the obtaining of the zoom multiple instruction, receiving a zoom multiple adjustment operation input by a user; and adjusting the zoom multiple of the camera based on the zoom multiple adjustment operation.

20. A non-transitory computer readable storage medium storing a lossless photographing program for a mobile terminal thereon which, when executed by a processor, implement operations comprising:

obtaining a zoom multiple instruction of a camera sensor in a current photographing state in response to a photographing instruction being detected;

determining whether a zoom multiple corresponding to the zoom multiple instruction is greater than or equal to 2;

switching an image output mode in response to the zoom multiple being greater than or equal to 2;

regaining and sending a photographing frame image for an image signal processing in the switched image output mode; and obtaining and outputting the processed image to finish photographing;

wherein the lossless photographing method of the mobile terminal further comprises:

setting a buffer queue used for storing photographing frame images of the camera sensor;

storing the photographing frame images acquired by the camera sensor into the buffer queue;

obtaining the photographing frame images from the buffer queue in a Binning output mode;

wherein the buffer queue is configured to store a plurality of latest photographing frame images when a user is performing image preview and has not yet pressed a photographing button, and old photographing frame images are continuously deleted and latest photographing frame images are added during the preview process; and wherein when the user presses the photographing button, directly obtaining the latest photographing frame image from the buffer queue or selecting an optimal image by an algorithm for output;

wherein the switching of the image output mode is performed in response to the photographing instruction being detected and when the zoom multiple is greater than or equal to 2; wherein the buffer queue is used to provide at least one latest photographing frame image when the photographing instruction is detected.

* * * * *